(12) United States Patent
Salvador et al.

(10) Patent No.: US 11,595,793 B2
(45) Date of Patent: *Feb. 28, 2023

(54) FACILITATION OF INTERCONNECTIVITY FOR MOBILE DEVICES FOR 5G OR OTHER NEXT GENERATION NETWORK

(71) Applicant: AT&T Mobility II LLC, Atlanta, GA (US)

(72) Inventors: Andy Salvador, Bellevue, WA (US); Donald Philips, Snohomish, WA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/652,594

(22) Filed: Feb. 25, 2022

(65) Prior Publication Data
US 2022/0182801 A1  Jun. 9, 2022

Related U.S. Application Data

(63) Continuation of application No. 17/101,798, filed on Nov. 23, 2020, now Pat. No. 11,297,471, which is a
(Continued)

(51) Int. Cl.
*H04W 4/20* (2018.01)
*H04W 4/02* (2018.01)
(Continued)

(52) U.S. Cl.
CPC ............ *H04W 4/20* (2013.01); *H04L 69/18* (2013.01); *H04W 4/026* (2013.01); *H04W 4/027* (2013.01); *H04W 16/26* (2013.01)

(58) Field of Classification Search
CPC ....... H04W 4/20; H04W 4/026; H04W 4/027; H04W 16/26; H04W 88/04;
(Continued)

(56) References Cited

U.S. PATENT DOCUMENTS 6,763,226 B1 * 7/2004 McZeal, Jr. ......... H04M 1/7243
455/575.1
8,805,273 B2 * 8/2014 Panpaliya ......... H04W 36/0072
455/507

(Continued)

OTHER PUBLICATIONS

U.S. Appl. No. 17/101,798, filed Nov. 23, 2020.
(Continued)

*Primary Examiner* — Julio R Perez
(74) *Attorney, Agent, or Firm* — Amin, Turocy & Watson, LLP

(57) ABSTRACT

Wireless mobile device functionality can be added to radio devices via a hardware device that comprises wireless network access. Alternatively, radio device functionality can be shared with a wireless mobile device or the hardware device. The functionalities of either device can be shared via a physical or wireless connection. For example, a microphone device comprising a display screen and long-term evolution (LTE) functionality can be connected to a radio device to facilitate LTE functionality for the radio device. Thus, a user of the radio device can utilize the display screen of the microphone device to send text data, which could not previously be sent by the radio device, over the wireless network via the microphone device.

20 Claims, 10 Drawing Sheets

Related U.S. Application Data continuation of application No. 16/564,706, filed on Sep. 9, 2019, now Pat. No. 10,880,703.

(51) Int. Cl.
  *H04L 69/18* (2022.01)
  *H04W 16/26* (2009.01)

(58) Field of Classification Search
  CPC .......... H04W 52/0254; H04W 52/028; H04L 69/18; Y02D 30/70
  See application file for complete search history.

(56) References Cited

U.S. PATENT DOCUMENTS

| | | | |
|---|---|---|---|
| 9,100,988 B2 | 8/2015 | Vilmur et al. | |
| 9,279,680 B2* | 3/2016 | Buchanan | G01C 25/005 |
| 9,503,163 B2* | 11/2016 | Lastinger | H04B 7/0495 |
| 2004/0121781 A1 | 6/2004 | Sammarco | |
| 2006/0084457 A1 | 4/2006 | Laha et al. | |
| 2006/0101116 A1* | 5/2006 | Rittman | H04L 12/1813 |
| | | | 709/204 |
| 2006/0262800 A1* | 11/2006 | Martinez | H04W 88/06 |
| | | | 370/395.52 |
| 2015/0046820 A1* | 2/2015 | Gazdzinski | G06Q 30/0256 |
| | | | 715/719 |
| 2018/0337711 A1* | 11/2018 | Bilotta | H04B 7/0413 |

OTHER PUBLICATIONS

U.S. Appl. No. 16/564,706, filed Sep. 9, 2019.
Non Final Office action received for U.S. Appl. No. 16/564,706 dated May 15, 2020, 30 Pages.
Notice of Allowance received for U.S. Appl. No. 17/101,798 dated Nov. 26, 2021, 39 Pages.

* cited by examiner

FACILITATION OF INTERCONNECTIVITY FOR MOBILE DEVICES FOR 5G OR OTHER NEXT GENERATION NETWORK

RELATED APPLICATIONS

The subject patent application is a continuation of, and claims priority to each of, U.S. patent application Ser. No. 17/101,798, filed Nov. 23, 2020, and entitled "FACILITATION OF INTERCONNECTIVITY FOR MOBILE DEVICES FOR 5G OR OTHER NEXT GENERATION NETWORK," which is a continuation of U.S. patent application Ser. No. 16/564,706 (now U.S. Pat. No. 10,880,703), filed Sep. 9, 2019, and entitled "FACILITATION OF INTERCONNECTIVITY FOR MOBILE DEVICES FOR 5G OR OTHER NEXT GENERATION NETWORK," the entireties of which applications are hereby incorporated by reference herein.

TECHNICAL FIELD

This disclosure relates generally to facilitating interconnectivity between devices. For example, this disclosure relates to facilitating interconnectivity between a radio device and wireless mobile device of a 5G, other network, or other next generation network air interface.

BACKGROUND $5^{th}$ generation (5G) wireless systems represent a next major phase of mobile telecommunications standards beyond the current telecommunications standards of $4^{th}$ generation (4G). Rather than faster peak Internet connection speeds, 5G planning aims at higher capacity than current 4G, allowing a higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption, and lower latency than 4G equipment.

The above-described background relating to facilitating interconnectivity between a radio device and wireless mobile device is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
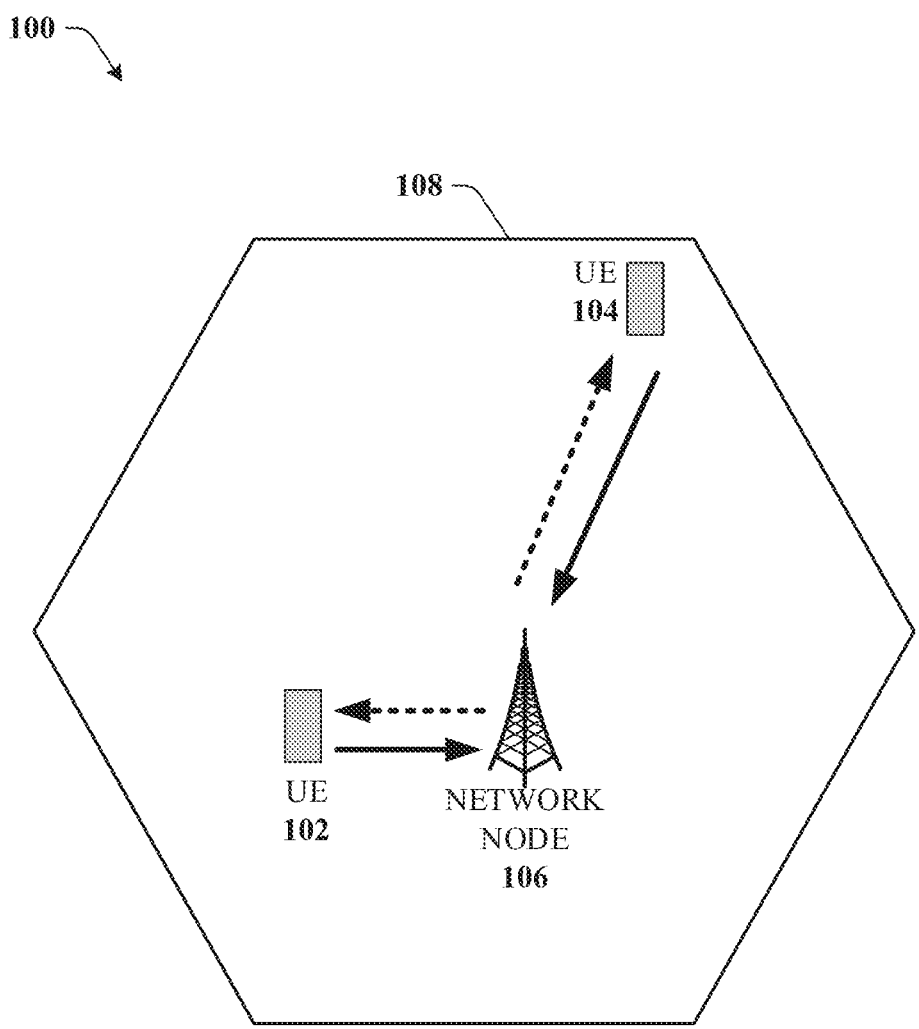
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate interconnectivity between a radio device and wireless mobile device for a 5G air interface or other next generation networks. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.12 technology. Additionally, substantially all aspects disclosed herein can be exploited in legacy telecommunication technologies.

Described herein are systems, methods, articles of manufacture, and other embodiments or implementations that can facilitate interconnectivity between a radio device and wireless mobile device for a 5G network. Facilitating interconnectivity between a radio device and wireless mobile device for a 5G network can be implemented in connection with any type of device with a connection to the communications network (e.g., a mobile handset, a computer, a handheld device, etc.) any Internet of things (TOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception.

In some embodiments the non-limiting term radio network node or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with or take the place of policy and charging rules function ("PCRF") network elements so that policies such as quality of service and traffic management and routing can be synchronized and managed end to end.

To meet the huge demand for data centric applications, 4G standards can be applied 5G, also called new radio (NR) access. 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

A land mobile radio system (LMRS) is a person-to-person voice communication system comprising two-way radio transceivers (e.g., an audio transmitter and receiver in one unit) which can be mobile, installed in vehicles, or portable (e.g., walkie-talkies). Public land mobile radio systems are made for use exclusively by public safety organizations such as police, fire, and ambulance services, and other governmental organizations, and use special frequencies reserved for these services. Private land mobile radio systems are designed for private commercial use, by firms such as taxis or delivery services. Companies invest large sums of money in LMRSs, phone sets, and radio handsets can cost thousands of dollars. Additionally, radio handsets lack the intelligence and video/data throughput that a cellular device provides. By using an accessory hardware device and associated applications, the disclosed solution can provide cross wireless network interconnectivity such that all the benefits of an LTE cellular device can be available to the radio handset. This solution addresses use among various different devices used by a company and can make use of all the signaling, power and apps available from one device to another.

There are at least three solution variants for the proposed technology. First, the radio can be connected to a remote speaker mic. This has the added benefit of providing a high-power user equipment boost to the device without having to hold the device to the face. Additionally, in yet another example, the remote speaker mic can be used to provide a boost to the LTE device that is using proximity services (ProSe). ProSe is an off network, device to device, radio communication that is technically limited to about one mile. However, HPUE can extend device-to-device communication by many more miles. Second, the accessory device can be attached via a cover or "sled" for the radio device. Third, modular hardware pieces can be attached to a radio or hotspot to create an interoperable wireless network device.

Cross-network interconnectivity can be provided such that the user can have some type of connectivity whether Wi-fi calling, P25, cellular, satellite etc. Signals and features can also be shared from one device to the accessory and vice versa, including additional power and power boosting. The commercial benefit includes providing premium service connectivity to customers; and extending the investment of companies by adding additional functionality to expensive equipment to extend the equipment life.

The current disclosure can enable a servant technology that adds interoperable wireless technologies to a host device that lacks the interoperable wireless technology. For example, an LTE cellular (e.g., host device) can be enabled with land mobile radio (LMR) functionality (e.g., trans-European trunked radio and P25). This feature can be leveraged due to its user capacity over a single channel and the high encryption potential. Another example can allow an existing LMR radio, enhanced with both Band 14 LTE wireless functionality and high-power user equipment (HPUE) power class 1 for added LTE functionality and increased communication coverage. Because some radios have the ability to work over multiple channels simultaneously, this disclosure can take advantage of multi-channels to transmit data, video, etc. over multi-channels to end devices which are also connected to the system. Additionally, other features, such as satellite connections, encryption, decryptions, security, broadcasts to multi-users, etc. can be utilized and/or exploited by this disclosure.

The current solution can be utilized with all wireless networks—commercial or private, including but not limited to LTE cellular and Band 14, FirstNet, pubic, private, military, private wireless networks, T-Band television spectrum, citizens broadband radio service (CBRS), HPUE, and/or proximity services. The additive servant wireless technology can be embedded in a separate hardware piece such as a remote speaker mic (RSM), dongle, memory stick form factor, cellular case, hardware module and/or the like. For example, a hardware module can be a stand-alone LTE hotspot (host), that is converted into a voice/data communication device, through the physical coupling of the hardware module. Additional functionality (e.g., additional wireless technology) can be added by the additional coupling of an RSM. Furthermore, it should be noted that connectivity between the hardware component parts can be achieved by either physical and/or wireless connection.

The current disclosure can also leverage artificial intelligence to perform intelligent decision making to control various device functionality. Additionally, the current disclosure can leverage the existing technology of the host device. For example, where servant device is connected to an LMR device, servant device (e.g., mobile phone) can take advantage of the functionality of the LMR device that a typical cellphone may not have. For instance, a push-to-talk feature can be utilized by an LTE mobile phone based on its connectivity with the LMR device (that comprises the push-to-talk feature) without the need for an additional LTE-based push-to-talk software. Group broadcasting through daisy chaining can be achieved with the same strategy.

Interoperability between many of the wireless networks can be performed through toggling between networks enabled by this disclosure. For example, where LTE is added to an LMR device, two conversations (e.g., voice, data, picture, video, etc.) can be transacted simultaneously and/or concurrently (e.g., one conversation from LTE to LTE and another conversation over radio to radio). However, conversations can be bridged between several groups, such as an LMR group connected to an LTE group, such that one conversation can be had between LTE and radio groups. Additionally, an LMR radio can use functions specific to LTE smartphone-type services, such as broadcasting photos taken from the RSM, providing GPS locations, and/or lone man down alerts. The lone man down alerts can be based on gyroscope functionality that has been added to the RSM. Thus, the gyroscope of the accessory device can be utilized by the RSM device to provide an indication that an emergency services personnel is in trouble (e.g., laying down). In another scenario, the LMR device would be able to interact with the LTE servant device's emergency button or even repurpose a programmable button from the servant technology for use and broadcast by the host LMR device.

Utilizing AI and standard radio frequency (RF) detection, the best or target wireless network (e.g., LTE, P25, Wi-Fi calling, CBRS, etc.) can be selected and switched based on signal strength and/or special payload handling (e.g., encrypted data, video, etc.) and keep communication transition silent and unnoticeable. Dual SIMs can facilitate dual standby (e.g., one live LTE radio at a time—dual SIM/dual standby) or where both SIMs are live (dual SIM/dual VOLTE) for at least two active conversations, at least one additional conversation can be hosted on the host device. Dual standby can facilitate one active transaction but allow the user to toggle between various service providers because dual SIMs are active and live. Thus, a conversation can be toggled or conjoined between two different service providers. The SIMs can be for any network type from LTE, to private networks, to CBRS etc. For a modular puck variant, an access point network (APN) can automatically switch from hotspot to smartphone. Because HPUE can be unsafe when used in a certain proximity to a user, the HPUE usage can be enabled based on safety standards (e.g., proximity of device to face, motion, hardware interaction, etc.). For example, the HPUE functionality on a flip phone can be activated based on when the flip phone is opened, closed, or when an RSM is attached. For other small form factor devices, (e.g., fold out tablets from a smartphone form factor) the HPUE can be activated upon opening. Thus, different connections can be enabled based on the configuration (e.g., on a charger base) of the hardware.

It should also be noted that an artificial intelligence (AI) component can facilitate automating one or more features in accordance with the disclosed aspects. A memory and a processor as well as other components can include functionality with regard to the figures. The disclosed aspects in connection with facilitating interconnectivity between a radio device and wireless mobile device can employ various AI-based schemes for carrying out various aspects thereof. For example, a process for detecting one or more trigger events (e.g., physical and/or wireless connection), merging LTE and radio communications, selecting LTE or radio communication as a result of the one or more trigger events, and modifying one or more reported measurements, and so forth, can be facilitated with an example automatic classifier system and process. In another example, a process for penalizing LTE communication while preferring radio communication or vice versa can be facilitated with the example automatic classifier system and process.

An example classifier can be a function that maps an input attribute vector, $x=(x1, x2, x3, x4, xn)$, to a confidence that the input belongs to a class, that is, $f(x)$=confidence(class). Such classification can employ a probabilistic and/or statistical-based analysis (e.g., factoring into the analysis utilities and costs) to prognose or infer an action that can be automatically performed. In the case of communication systems, for example, attributes can be a frequency band and a technology and the classes can be an output power reduction value. In another example, the attributes can be a frequency band, a technology, and the presence of an object and the classes can be an output power reduction value.

A support vector machine (SVM) is an example of a classifier that can be employed. The SVM can operate by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and probabilistic classification models providing different patterns of independence can be employed. Classification as used herein also may be inclusive of statistical regression that is utilized to develop models of priority.

The disclosed aspects can employ classifiers that are explicitly trained (e.g., via a generic training data) as well as implicitly trained (e.g., via observing mobile device usage as it relates to triggering events, observing network frequency/technology, receiving extrinsic information, and so on). For example, SVMs can be configured via a learning or training phase within a classifier constructor and feature selection module. Thus, the classifier(s) can be used to automatically learn and perform a number of functions, including but not limited to modifying a transmit power, modifying one or more reported mobility measurements, and so forth. The criteria can include, but is not limited to, predefined values, frequency attenuation tables or other parameters, service provider preferences and/or policies, and so on.

In one embodiment, described herein is a method comprising receiving, by a first wireless network device comprising a processor, an indication that the first wireless network device is attached to a radio network device of a wireless network. In response to the receiving, the method can comprise facilitating, by the first wireless network device, adding a functionality of the first wireless network device to the radio network device to facilitate a communication between the radio network device and a second wireless network device of the wireless network. Additionally, in response to the adding, the method can comprise facilitating, by the first wireless network device, a utilization of the functionality of the first wireless network device by the radio network device According to another embodiment, a system can comprise determining, by the system comprising a host wireless network device of a wireless network, that the host wireless network device is connected to a servant network device associated with a radio network. In response to the determining, the system can comprise including, by the host wireless network device, a functionality of the servant radio network device to the host wireless network device, wherein the functionality is associated with the radio network. Furthermore, based on the functionality, the system can comprise transmitting a radio signal to a radio network device of the radio network.

According to yet another embodiment, described herein is a machine-readable storage medium that can perform the operations comprising receiving an indication that a first wireless network device of a wireless network is connected to a radio network device of a radio network. In response to the receiving, the machine-readable storage medium can perform the operations comprising facilitating a configuration of the radio network device to enable a functionality of the first wireless network device at the radio network device to facilitate a communication between the radio network device and a second wireless network device of the wireless network. Additionally, in response to the facilitating the configuration, the machine-readable storage medium can perform the operations comprising facilitating a utilization of the functionality of the first wireless network device by the radio network device.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g., LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (GHz) and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
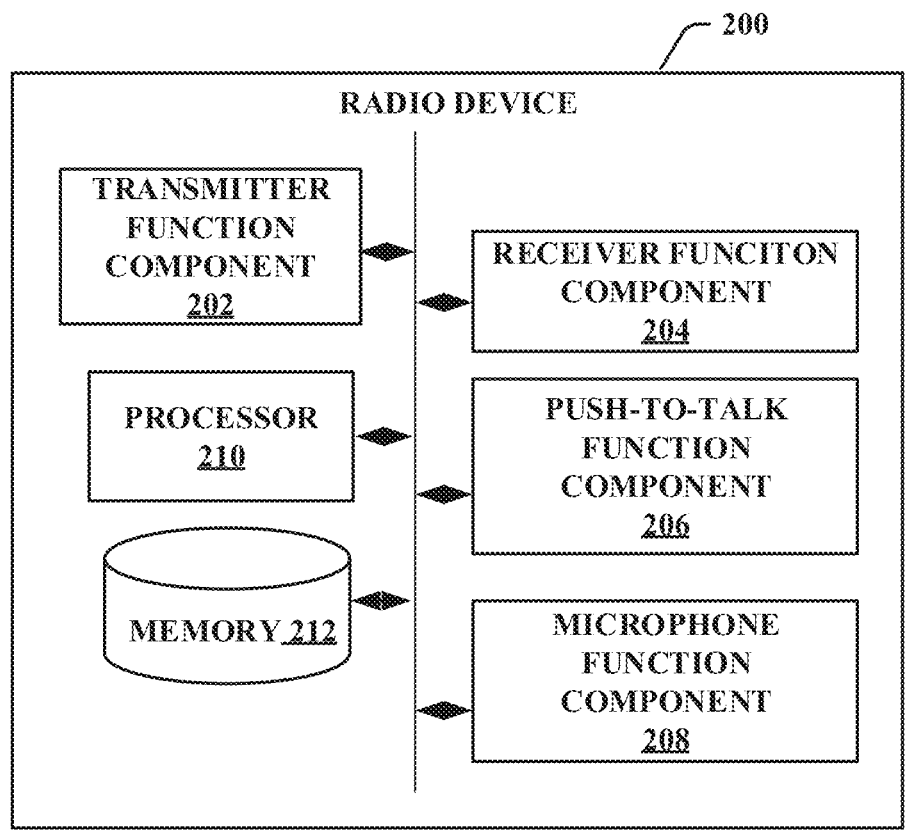
FIG. 2 illustrates an example schematic system block diagram of land mobile radio device comprising land mobile radio functionality according to one or more embodiments.

Referring now to FIG. 2, illustrated is an example schematic system block diagram of land mobile radio device comprising land mobile radio functionality according to one or more embodiments. The radio device 200 can comprise a transmitter function component 202, a receiver function component 204, a push-to-talk function component 206, a microphone function component 208, a processor 210, and a memory 212, which can all be communicatively coupled. The processor 210 can correspond to a processing component from a plurality of processing components. Aspects of the processor 210 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. In an aspect, the processor 210 can also include memory 212 that stores computer executable components and instructions. The transmitter function component 202 can correspond to a transmitter that transmits radio signals to other land mobile radio devices. The receiver function component 204 can correspond to a receiver component operable to receive radio signals from the other land mobile radio devices. The push-to-talk function component 206 can correspond to a push-to-talk component capable of allowing a user to press a button when he/she would like to begin communication with another land mobile radio device via a microphone component that corresponds to the microphone function component 208. It should be noted that there are additional components and functionalities of the radio device 200 that are not included in this disclosure for the sake of brevity. However, these additional functions and components (now known and unknown) can fall under the scope and spirit of this disclosure. The aforementioned functions of the radio device 200 can be ported to the UE 102 (e.g., wireless mobile device) via a wireless and/or physical connection.

Figure 3:
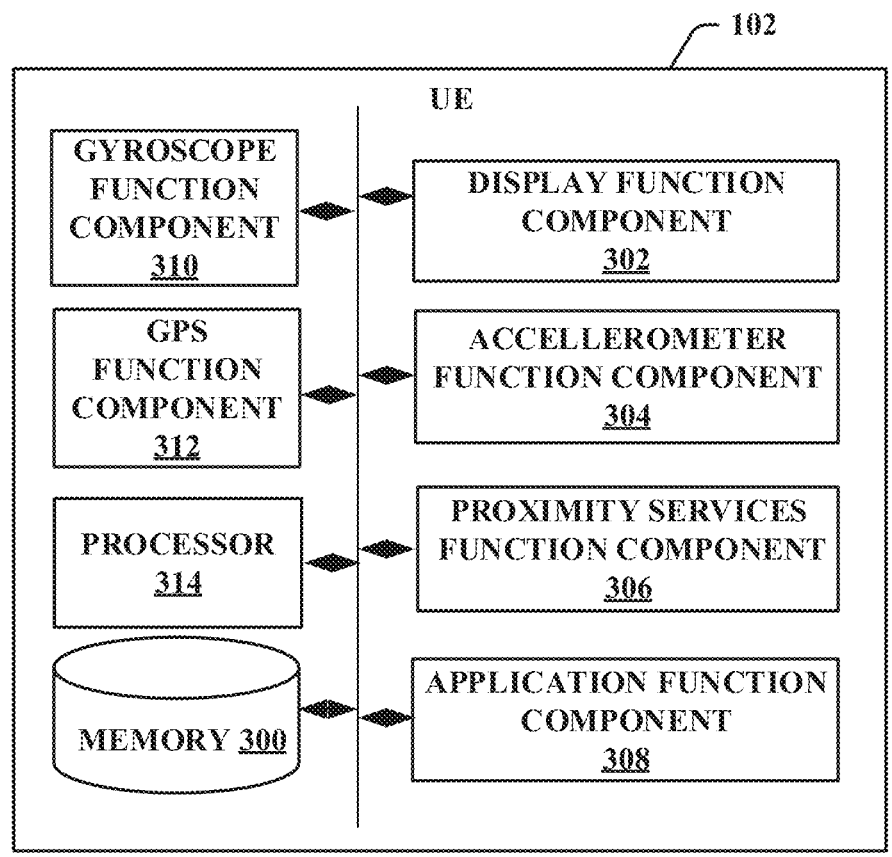
FIG. 3 illustrates an example schematic system block diagram of mobile device comprising mobile device functionality according to one or more embodiments.

Referring now to FIG. 3, illustrated is an example schematic system block diagram of mobile device comprising mobile device functionality according to one or more embodiments. The UE 102 can comprise a display function component 302, an accelerometer function component 304, a proximity services function component 306, an application function component 308, a gyroscope function component 310, a global positioning system (GPS) function component 312 a processor 314, and a memory 300, which can all be communicatively coupled. The processor 314 can correspond to a processing component from a plurality of processing components. Aspects of the processor 314 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. In an aspect, the processor 314 can also include memory 300 that stores computer executable components and instructions. The display function component 302 can correspond to a display screen of the UE 102 that is operable to display digital data (e.g., a display screen) of the UE 102. The accelerometer function component 204 can correspond to an accelerometer component operable to generate speed and/or velocity data of the UE 102. The proximity services function component 306 can correspond to a proximity services component (e.g., Bluetooth, Zigbee, etc.) capable of facilitating a service to the UE 102 based on the UE's proximity to another object/device. Additionally, the application services function component can correspond to software applications found on the memory 316 of the UE 102 or accessible via cloud storage. In like manner, the gyroscope function component 310 can correspond to a gyroscope component operable to generate orientation data associated with the UE 102. For example, the gyroscope component can determine if the UE 102 has been dropped or is on the ground, which could indicate that an emergency services personnel is injured or a status of the emergency services personnel. Furthermore, the GPS function component 312 can correspond to GPS component of the UE 102 that is operable to determine a location of the UE 10. It should be noted that there are additional components and functionalities of the UE 102 that are not included in this disclosure for the sake of brevity. However, these additional functions and components (now known and unknown) can fall under the scope and spirit of this disclosure. The aforementioned functions of the UE 102 can be ported to the radio device 200 (e.g., LMRS device) via a wireless and/or physical connection.

Figure 4:
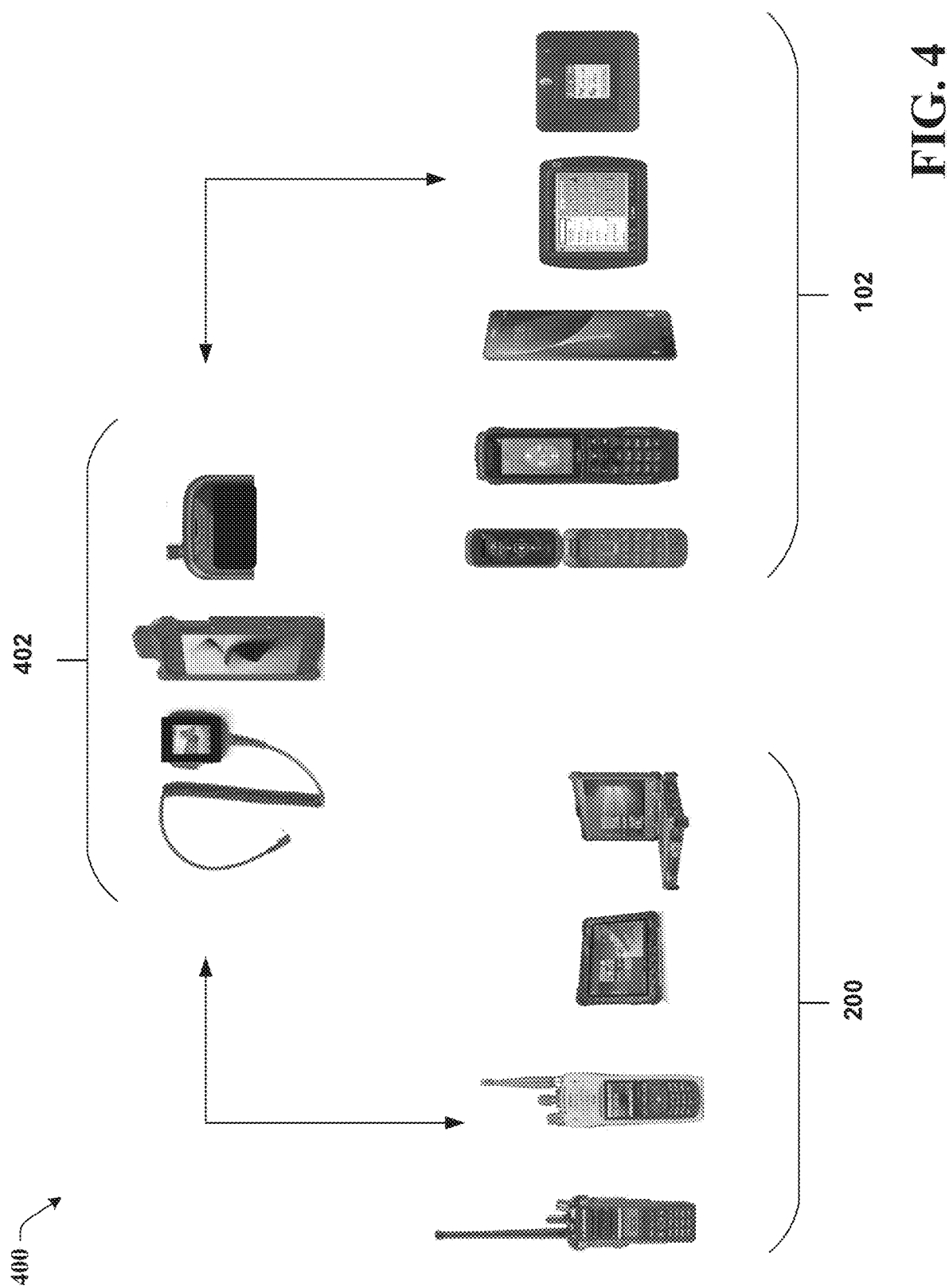
FIG. 4 illustrates an example schematic system block diagram of a hardware device being utilized to provide land mobile radio functionality to a mobile device and/or mobile device functionality to a land mobile radio device according to one or more embodiments.

Referring now to FIG. 4, illustrated is an example schematic system block diagram of a hardware device being utilized to provide land mobile radio functionality to a mobile device and/or mobile device functionality to a land mobile radio device according to one or more embodiments. The current solution can be utilized with all wireless networks comprising various UEs 102 (e.g., flip phone, feature, smartphone, phablet, puck/hotspot, etc.). The additive servant wireless technology functions found within the UEs 102 can be embedded in a separate hardware piece 402 (e.g., such as an RSM, dongle, memory stick form factor, cellular case, hardware module, microphone, etc.), which can add the functions of the UEs 102 to the radio devices 200 (P25 LMR, converged LMR/LTE, tablet, laptop, etc.). Alternatively, the separate hardware piece 402 (e.g., such as an RSM, dongle, memory stick form factor, cellular case, hardware module, etc.) can add the functions of the radio device 200 to the UEs 102. For example, the hardware 402 can be a stand-alone LTE hotspot (host), that is converted into a voice/data communication device, through the physical coupling of the hardware piece to the radio device 200. Thus, additional functionality (e.g., additional wireless technology) can be added by the additional coupling of an RSM. Furthermore, it should be noted that connectivity between the hardware piece 402 and the radio device 200 and/or the UE 102 can be achieved by either a physical and/or a wireless connection. Therefore, the gyroscope functionality of the UE 102 can be provided to the radio device 200 such that the orientation of the radio device 200 can be determined be the addition of the hardware piece 402. Consequently, the hardware piece 402 can comprise one or more of the functionalities of the UE 102 as depicted in FIG. 3 and/or one or more of the functionalities of the radio device 200 as depicted in FIG. 2.

Figure 5:
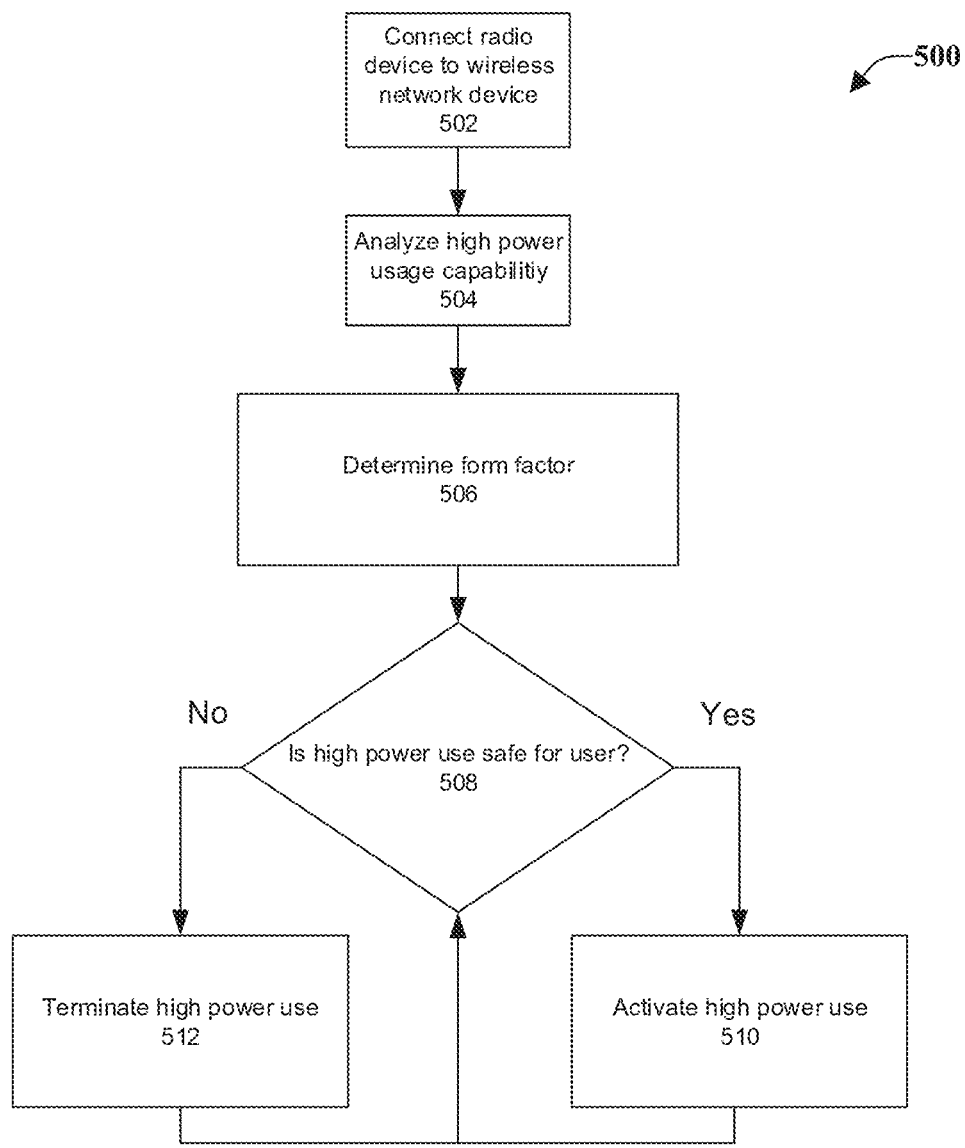
FIG. 5 illustrates an example schematic system flow diagram of a power allocation based on a configuration of the system according to one or more embodiments.

FIG. 5 illustrates an example schematic system flow diagram of a power allocation based on a configuration of the system 500 according to one or more embodiments. HPUE usage can be enable based on safety standards (e.g., proximity of device to face), motion, and/or hardware interaction. For example, at block 502 the radio device 200 can be connected to the hardware piece 402. The system 500, comprised of the radio device 200 connected to the hardware piece 402, can analyze the high-power usage of the radio device 200 hardware piece 402 configuration at block 504 to determine a form factor at block 506. The system 500 can activate the HPUE based on the form factor. For example, if the configuration is determined to be that of a flip phone (which can be open, closed, have an RSM attached, etc.), then the system can activate the HPUE functionality at block 510 if the high-power use is safe for a user. Alternatively, the system 500 can terminate the high-power use at block 512 if the high-power use 508 is not safe for a user. The activation can be a function of the determination that the configuration is that of a flip phone because if the flip phone is closed, then it can be assumed that the flip phone is away from the face of a user where the high power use might be unsafe for the user. For other small form factor devices, (e.g., fold out tablets transitioning from a smartphone form factor, etc.) the HPUE can be activated upon opening.

Figure 6:
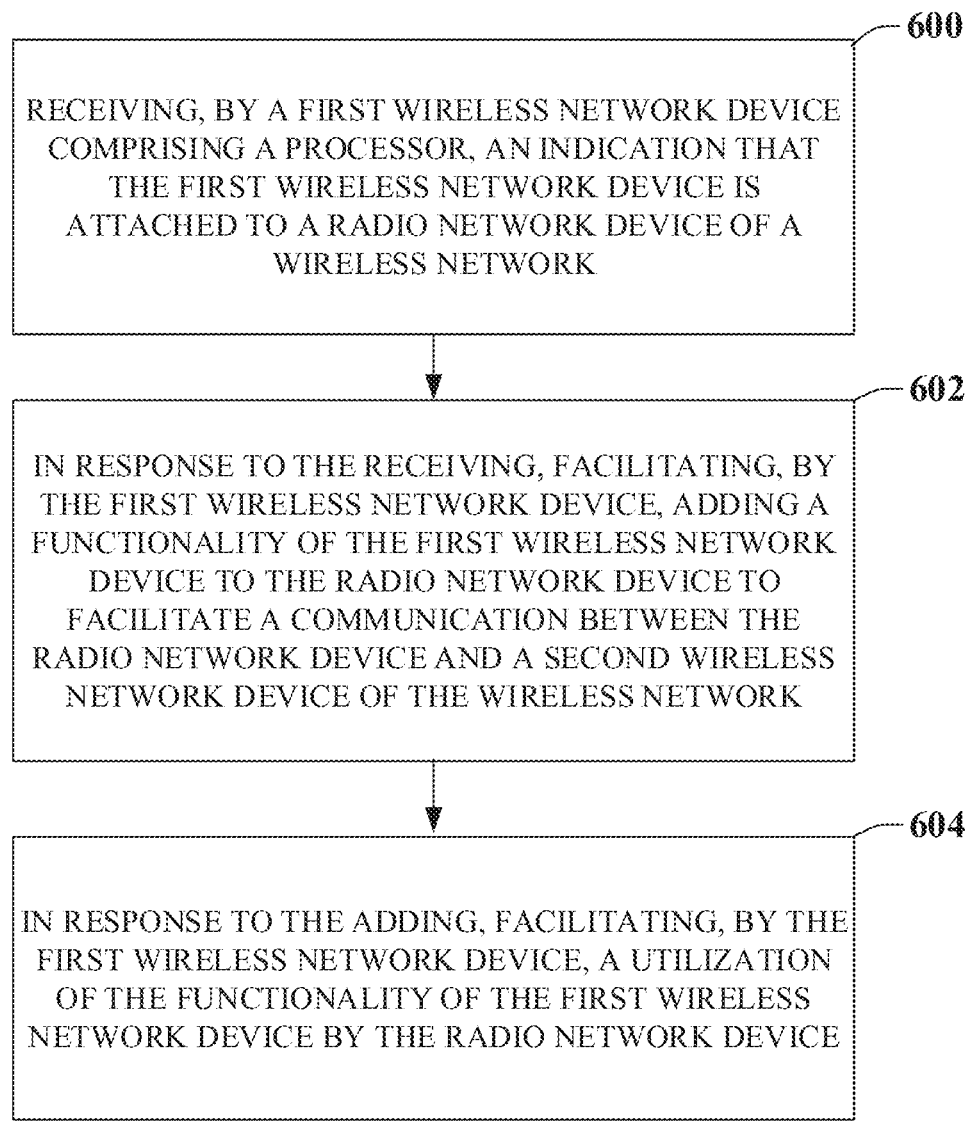
FIG. 6 illustrates an example flow diagram for a method for facilitating interconnectivity between a radio device and wireless mobile device for a 5G network according to one or more embodiments.

Referring now to FIG. 6, illustrated is an example flow diagram for a method for facilitating interconnectivity between a radio device and wireless mobile device for a 5G network according to one or more embodiments. At element 600, the method can comprise receiving, by a first wireless network device (e.g., hardware piece 402) comprising a processor, an indication that the first wireless network device (e.g., hardware piece 402) is attached to a radio network device (e.g., radio device 200) of a wireless network. In response to the receiving, at element 602, the method can comprise facilitating, by the first wireless network device (e.g., hardware piece 402), adding a functionality of the first wireless network device (e.g., hardware piece 402) to the radio network device (e.g., radio device 200) to facilitate a communication between the radio network device (e.g., radio device 200) and a second wireless network device (e.g., UE 102) of the wireless network. Additionally, in response to the adding, the method can comprise facilitating, by the first wireless network device, a utilization of the functionality of the first wireless network device (e.g., hardware piece 402) by the radio network device (e.g., radio device 200) at element 604.

Figure 7:
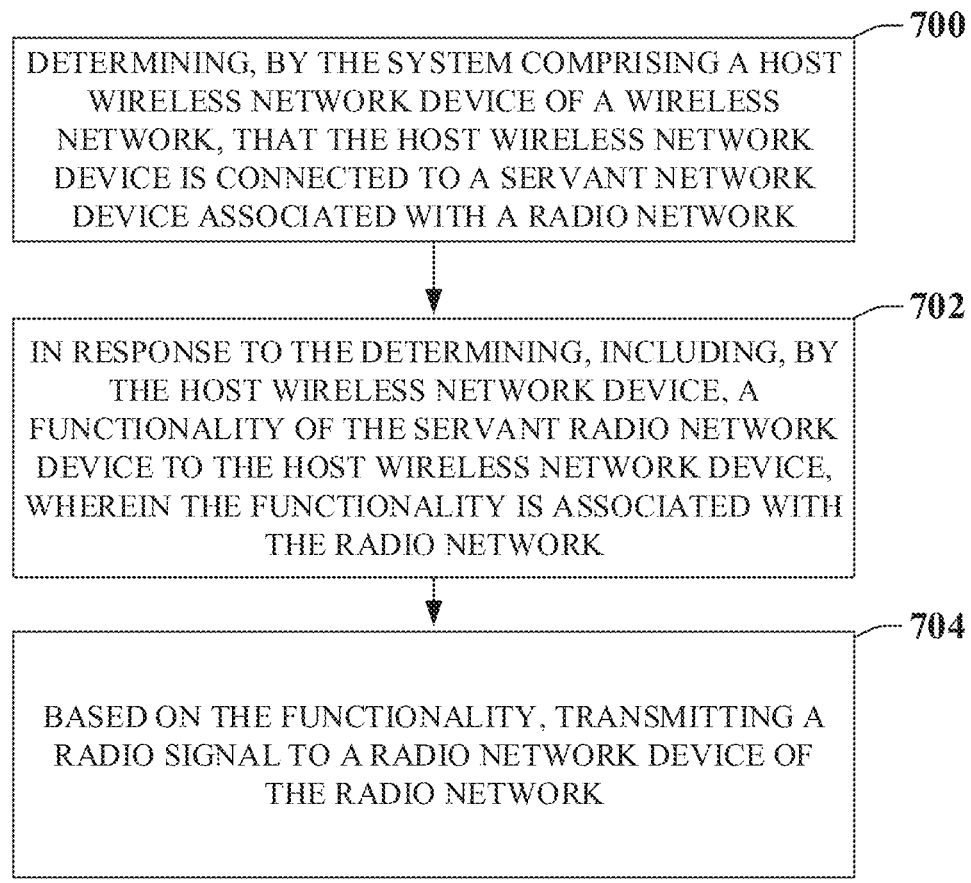
FIG. 7 illustrates an example flow diagram for a system for facilitating interconnectivity between a radio device and wireless mobile device for a 5G network according to one or more embodiments.

Referring now to FIG. 7, illustrated is an example flow diagram for a system for facilitating interconnectivity between a radio device and wireless mobile device for a 5G network according to one or more embodiments. At element 700, the system can comprise determining, by the system comprising a host wireless network device (e.g., UE 102) of a wireless network, that the host wireless network device (e.g., UE 102) is connected to a servant network device (e.g., hardware piece 402), associated with a radio network. In response to the determining, at element 702, the system can comprise including, by the host wireless network device (e.g., UE 102), a functionality of the servant radio network device (e.g., hardware piece 402), to the host wireless network device (e.g., UE 102), wherein the functionality is associated with the radio network. Furthermore, at element 704, based on the functionality, the system can comprise transmitting a radio signal to a radio network device (e.g., radio device 200) of the radio network.

Figure 8:
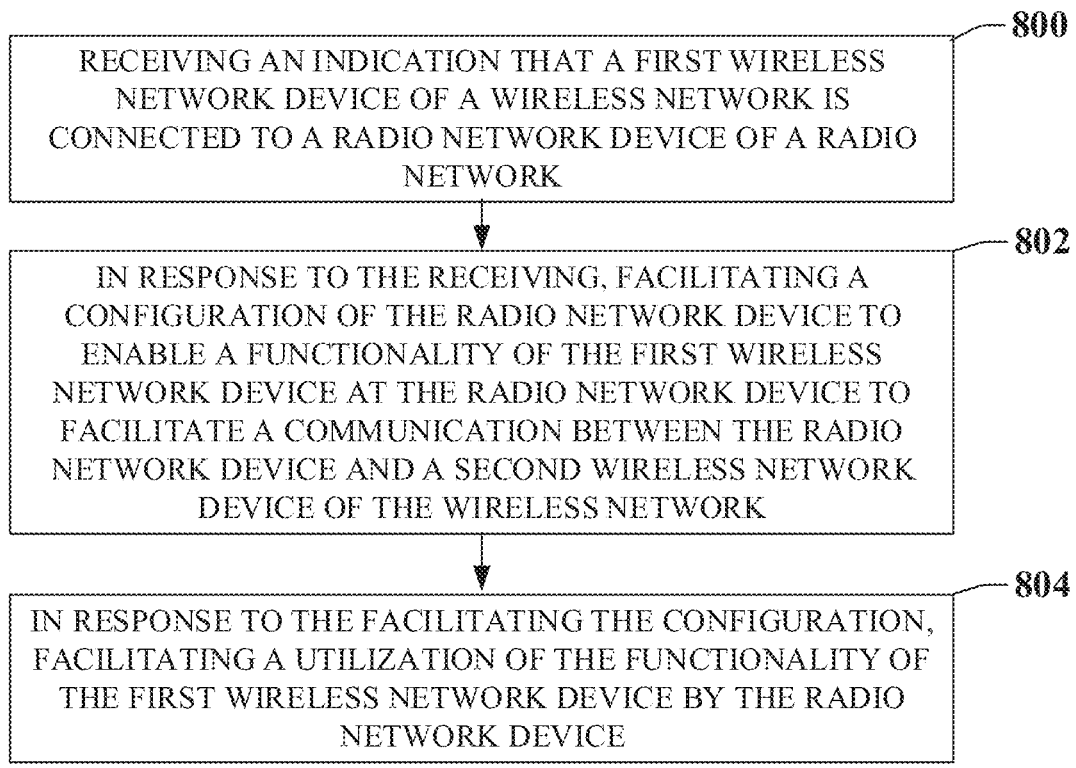
FIG. 8 illustrates an example flow diagram for a machine-readable storage medium for facilitating interconnectivity between a radio device and wireless mobile device for a 5G network according to one or more embodiments.

Referring now to FIG. 8, illustrated is an example flow diagram for a machine-readable storage medium for facilitating interconnectivity between a radio device and wireless mobile device for a 5G network according to one or more embodiments. At element 800, the machine-readable storage medium can perform the operations comprising receiving an indication that a first wireless network device (e.g., hardware piece 402) of a wireless network is connected to a radio network device (e.g., radio device 200) of a radio network. In response to the receiving, at element 802, the machine-readable storage medium can perform the operations comprising facilitating a configuration of the radio network device (e.g., radio device 200) to enable a functionality of the first wireless network device (e.g., hardware piece 402) at the radio network device to facilitate a communication between the radio network device (e.g., radio device 200) and a second wireless network device (e.g., UE 102) of the wireless network. Additionally, in response to the facilitating the configuration, at element 804, the machine-readable storage medium can perform the operations comprising facilitating a utilization of the functionality of the first wireless network device (e.g., hardware piece 402) by the radio network device (e.g., radio device 200).

Figure 9:
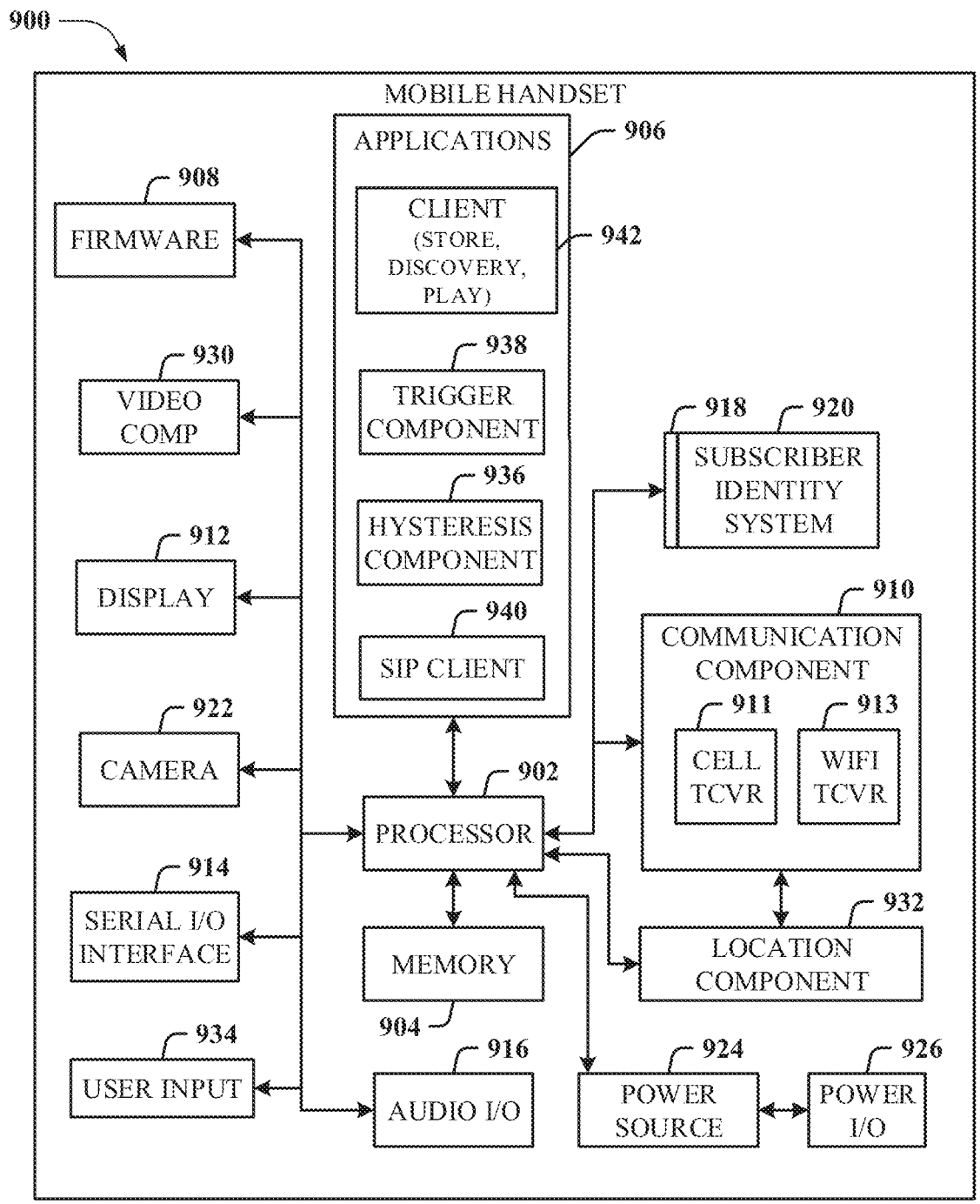
FIG. 9 illustrates an example block diagram of an example mobile handset operable to engage in a system architecture that facilitates secure wireless communication according to one or more embodiments described herein.

Referring now to FIG. 9, illustrated is a schematic block diagram of an exemplary end-user device such as a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera, and/or a video) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
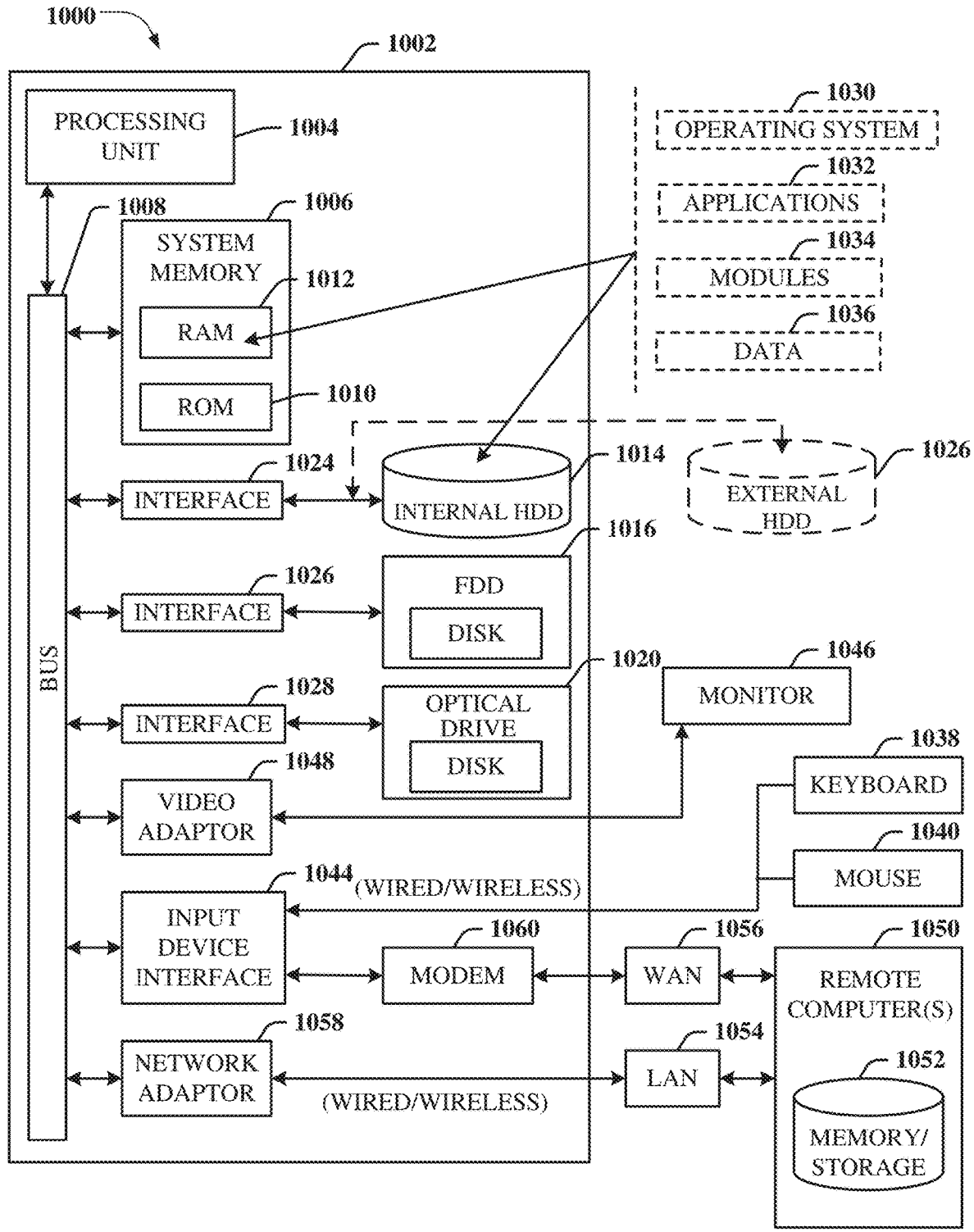
FIG. 10 illustrates an example block diagram of an example computer operable to engage in a system architecture that facilitates secure wireless communication according to one or more embodiments described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   determining, by a first user equipment comprising a processor, a form factor associated with radio network equipment connected to the first user equipment;
   and in response to determining the form factor, adding, by the first user equipment, a functionality of the first user equipment to the radio network equipment to enable a communication of information between the radio network equipment and a second user equipment,
   wherein the functionality comprises a high power user equipment functionality that increases a coverage area associated with the radio network equipment as compared to when the radio network equipment is not using the high power user equipment function.

2. The method of claim 1, further comprising:
receiving, by the first user equipment, an indication that the first user equipment is connected to the radio network equipment, wherein the determining of the form factor is performed in response to the receiving of the indication that the first user equipment is connected to the radio network equipment.

3. The method of claim 1, further comprising:
determining, by the first user equipment, whether a defined safety criterion relating to use of the high power user equipment functionality is satisfied based on the form factor associated with the radio network equipment.

4. The method of claim 3, further comprising:
in response to determining that the defined safety criterion is satisfied, activating, by the first user equipment, the high power user equipment functionality for use by the radio network equipment; or
in response to determining that the defined safety criterion is not satisfied, terminating, by the first user equipment, use of the high power user equipment functionality by the radio network equipment.

5. The method of claim 1, wherein the adding of the functionality of the first user equipment to the radio network equipment comprises adding an accelerometer functionality, a gyroscope functionality, a display functionality, a location services functionality, or an application functionality of the first user equipment to the radio network equipment.

6. The method of claim 1, wherein the functionality of the first user equipment comprises a long-term evolution network functionality, a fifth generation network functionality, or a sixth generation network functionality.

7. The method of claim 1, wherein the information is first information, and wherein the adding of the functionality of the first user equipment to the radio network equipment enables the radio network equipment to communicate, concurrently, the first information to the second user equipment via a wireless communication network and second information to a radio network.

8. The method of claim 1, wherein the first user equipment comprises, or is associated with, a speaker microphone that is able to be connected to the radio network equipment.

9. The method of claim 1, further comprising:
communicating, by the first user equipment, functionality information related to the functionality via a connection between the first user equipment and the radio network equipment.

10. The method of claim 1, further comprising:
in response to adding the functionality of the first user equipment to the radio network equipment, facilitating, by the first user equipment, the communication of the information between the radio network equipment and the second user equipment via a protocol not previously available to the radio network equipment prior to the adding of the functionality to the radio network equipment.

11. A system, comprising:
a processor; and
a memory that stores executable instructions that, when executed by the processor, facilitate performance of operations, comprising:
determining a form factor associated with servant network equipment that is connected to a radio device; and
in response to determining the form factor, providing a functionality of the servant network equipment to the radio device, wherein the functionality comprises a high power user equipment functionality that enables increasing a coverage area associated with the radio device.

12. The system of claim 11, wherein the operations further comprise:
determining that the radio device is connected to the servant network equipment, wherein the radio device is associated with a radio network, and wherein the determining of the form factor is performed in response to the determining that the radio device is connected to the servant network equipment.

13. The system of claim 11, wherein the service network equipment comprises, or is associated with, user equipment functionality comprising the high power user equipment functionality.

14. The system of claim 11, wherein the radio device is a land mobile radio device.

15. The system of claim 11, wherein the functionality is a first functionality, and wherein the operations further comprise:
accessing a second functionality of the radio device at the servant network equipment.

16. The system of claim 15, wherein the second functionality comprises a push-to-talk functionality, a trunked radio functionality, or an encryption functionality.

17. The system of claim 11, wherein the radio device is associated with a radio network, and wherein the operations further comprise:
based on the functionality of the servant network equipment provided to the radio device, enabling information to be transmitted from the radio device to a user equipment via network equipment of a communication network.

18. The system of claim 11, wherein the operations further comprise:
based on the functionality of the servant network equipment provided to the radio device, aggregating first data of a first communication conducted via a radio network associated with the radio device and second data of a second communication conducted via a communication network associated with the servant network equipment to generate aggregated data comprising the first data and the second data; and
communicating the aggregated data to a device via the radio network or the communication network.

19. A non-transitory machine-readable medium, comprising executable instructions that, when executed by a processor, facilitate performance of operations, comprising:
determining a form factor associated with a radio network device that is associated with a first user equipment; and
in response to determining the form factor, facilitating a configuration of the radio network device to enable utilization of a functionality of the first user equipment at the radio network device to enable a communication of information between the radio network device and a second user equipment, wherein the functionality comprises a high power user equipment functionality that is able to increase a coverage area associated with the radio network device.

20. The non-transitory machine-readable medium of claim 19, wherein the first network equipment and the second network equipment are associated with a communication network, wherein the radio network device is associated with a radio network, and wherein the first user equipment comprises, or is associated with, a remote speaker microphone that is able to be connected to the radio network device.

\* \* \* \* \*